(12) United States Patent
Volponi (10) Patent No.: US 7,415,328 B2
(45) Date of Patent: Aug. 19, 2008

(54) HYBRID MODEL BASED FAULT DETECTION AND ISOLATION SYSTEM

(75) Inventor: Allan J. Volponi, West Simsbury, CT (US)

(73) Assignee: United Technologies Corporation, Hartford, CT (US)

( * ) Notice: Subject to any disclaimer, the term of this patent is extended or adjusted under 35 U.S.C. 154(b) by 278 days.

(21) Appl. No.: 10/958,538

(22) Filed: Oct. 4, 2004

(65) Prior Publication Data

US 2008/0097662 A1    Apr. 24, 2008

(51) Int. Cl.
 *G06F 7/00* (2006.01)
(52) U.S. Cl. ............... 701/9; 701/100; 701/29; 702/182; 702/183; 702/184; 702/185; 703/2; 704/200; 704/202; 477/30
(58) Field of Classification Search ........... 701/29, 701/100; 702/182–185; 703/2; 704/200, 704/202; 477/30
See application file for complete search history.

(56) References Cited

U.S. PATENT DOCUMENTS

| | | | | |
|---|---|---|---|---|
| 4,215,412 | A * | 7/1980 | Bernier et al. ............. | 701/100 |
| 4,755,925 | A | 7/1988 | Tsuchiya et al. | |
| 5,293,323 | A * | 3/1994 | Doskocil et al. ............ | 702/185 |
| 5,519,298 | A | 5/1996 | Fukuhara et al. | |
| 6,415,276 | B1 * | 7/2002 | Heger et al. ................ | 706/52 |
| 6,539,783 | B1 * | 4/2003 | Adibhatla .................. | 73/118.1 |
| 6,594,620 | B1 | 7/2003 | Qin et al. | |
| 6,609,060 | B2 * | 8/2003 | Ulyanov et al. ............. | 701/106 |
| 6,718,252 | B2 * | 4/2004 | Kawai et al. ............... | 701/104 |
| 6,766,230 | B1 * | 7/2004 | Rizzoni et al. .............. | 701/29 |
| 6,909,960 | B2 * | 6/2005 | Volponi et al. ............. | 701/100 |
| 6,985,781 | B2 * | 1/2006 | Keeler et al. ............... | 700/44 |
| 7,020,595 | B1 * | 3/2006 | Adibhatla et al. ........... | 703/7 |
| 7,058,556 | B2 * | 6/2006 | Desai et al. ................. | 703/8 |
| 7,062,370 | B2 * | 6/2006 | Vhora et al. ................ | 701/100 |
| 7,136,809 | B2 * | 11/2006 | Volponi .................... | 704/201 |
| 7,216,063 | B2 * | 5/2007 | Nguyen et al. ............. | 702/193 |
| 7,216,071 | B2 * | 5/2007 | Volponi ..................... | 703/7 |
| 7,277,838 | B2 * | 10/2007 | Volponi et al. .............. | 703/7 |
| 2002/0087221 | A1 * | 7/2002 | Keeler et al. ............... | 700/48 |

(Continued)

FOREIGN PATENT DOCUMENTS

WO    WO 03/091911 A1    11/2003

OTHER PUBLICATIONS

European Search Report for EP Patent Application No. 05256132.1.

*Primary Examiner*—Thomas Black
*Assistant Examiner*—Wae Lenny Louie
(74) *Attorney, Agent, or Firm*—Bachman & LaPointe, P.C.

(57) ABSTRACT

Method for detecting faults in a device comprising the steps of receiving a plurality of performance parameters, applying the plurality of performance parameters to a first model to produce a plurality of estimated performance parameters, applying the plurality of performance parameters to a second model to produce a plurality of estimated device parameters, computing a plurality of residuals from the plurality of estimated device parameters, computing a plurality of distance measuring from the plurality of residuals, detecting at least one parameter deviation using the plurality of residuals and the plurality of estimated performance parameters, and setting at least one detection flag if the detected at least one parameter deviation is persistent.

25 Claims, 7 Drawing Sheets

U.S. PATENT DOCUMENTS

| | | | |
|---|---|---|---|
| 2003/0074171 A1* | 4/2003 | Desai et al. | 703/8 |
| 2003/0115037 A1* | 6/2003 | Sumida | 703/22 |
| 2003/0200069 A1* | 10/2003 | Volponi | 703/8 |
| 2004/0088100 A1* | 5/2004 | Volponi | 701/100 |
| 2004/0153815 A1* | 8/2004 | Volponi | 714/37 |
| 2007/0078576 A1* | 4/2007 | Salman et al. | 701/29 |
| 2007/0124113 A1* | 5/2007 | Foslien et al. | 702/185 |

* cited by examiner

HYBRID MODEL BASED FAULT DETECTION AND ISOLATION SYSTEM

BACKGROUND OF THE INVENTION (1) Field of the Invention

The present invention relates to a system, and method for utilizing such a system, for detecting and isolating faults in the operation of a device. More specifically, the present invention relates to a system, and method for utilizing such a system, for detecting faults in engines, such as gas turbine engines.

(2) Description of Related Art

A pivotal requirement for achieving accurate performance tracking of a gas turbine engine, in real time during flight operation, is the application of high fidelity models that impose low computational burdens. Although high fidelity physics based models of a gas turbine engine can be developed, they tend to become too computationally demanding to meet the accuracy requirements necessary to assemble a Fault Detection and Isolation (FDI) system. Likewise, empirical models suffer from a similar problem in that they typically require excessive memory and computational burden. A practical solution to this problem is to employ a mixture of modeling methodologies thereby creating a hybrid engine model that incorporates both physics-based and empirical components.

Hybrid systems have been developed for the purpose of tracking performance deterioration (such as changes in engine module efficiency and flow parameters) in individually monitored gas turbine engines. Such systems employ a physics-based component and use an empirical element to model the difference between the physics model and the monitored engine. Hybrid (engine) models and attendant performance estimation algorithms have been developed for tracking module performance shifts (deltas) in a real-time environment for use in such systems.

What is needed is an extension of the principle used in prior art systems to include the detection and isolation of engine faults other than, and in addition to, Module performance shifts. These include faults in measurement instrumentation (measurement error) as well as engine system faults such as variable geometry actuation faults, cooling flow faults, engine bleed valve faults, or any fault resulting in non-nominal engine operation.

SUMMARY OF THE INVENTION

Accordingly, it is an object of the present invention to provide a system, and method for utilizing such a system, for detecting and isolating faults in the operation of a device. More specifically, the present invention relates to a system, and method for utilizing such a system, for detecting faults in engines, such as gas turbine engines.

In accordance with the present invention, a method for detecting faults in a device comprises the steps of receiving a plurality of performance parameters, applying the plurality of performance parameters to a first model to produce a plurality of estimated performance parameters, applying the plurality of performance parameters to a second model to produce a plurality of estimated device parameters, computing a plurality of residuals from the plurality of estimated device parameters, computing a plurality of distance measuring from the plurality of residuals, detecting at least one parameter deviation using the plurality of residuals and the plurality of estimated performance parameters, and setting at least one detection flag if the detected at least one parameter deviation is persistent.

In accordance with the present invention, an apparatus for isolating and detecting faults in a device comprises an apparatus for receiving a plurality of performance parameters, an apparatus for applying the plurality of performance parameters to a first model to produce a plurality of estimated performance parameters, an apparatus for applying the plurality of performance parameters to a second model to produce a plurality of estimated device parameters, an apparatus for computing a plurality of residuals from the plurality of estimated device parameters, an apparatus for computing a plurality of distance measuring from the plurality of residuals, an apparatus for detecting at least one parameter deviation using the plurality of residuals and the plurality of estimated performance parameters, an apparatus for setting at least one detection flag if the detected at least one parameter deviation is persistent.

In accordance with the present invention, a method for detecting faults in a device, comprises the steps of receiving a plurality of performance parameters, detecting a deviation of at least one of the parameters, determining a persistency of the deviation, and setting at least one detection flag if the deviation is persistent, wherein the determining step uses a short term filter and a long term filter.

DETAILED DESCRIPTION OF THE PREFERRED EMBODIMENT(S)

It is a teaching of the present invention to provide a system and a method directed to addressing rapid shifts in performance, measurement error, and other faults by detecting their presence through signal-processing elements operating on observed parameter values. The processing is required to mitigate the number of false alarms that might be caused by model and parameter signal uncertainties. The engine parameters that drive this process are assumed to be those that are typically measured and available in a Full Authority Digital Engine Control (FADEC) or in a separate Engine Diagnostic Unit (EDU) performing the engine monitoring function. Typically observed parameters include spool speeds, fuel flow, inter-stage temperatures and pressures, bleed and variable geometry commands (where applicable), as well as engine ambient and aircraft flight condition indicators (altitude, speed, etc). These observed parameters serve as input parameters to a series of engine models that may be physics based, empirical, or hybrid.

Although the process can potentially be applied to more than two models, the preferred embodiment, for computational bandwidth considerations, will utilize two models; one having a physics-based element and the other employing an empirical methodology. This will insure a degree of model independence between the two model components.

Figure 1:
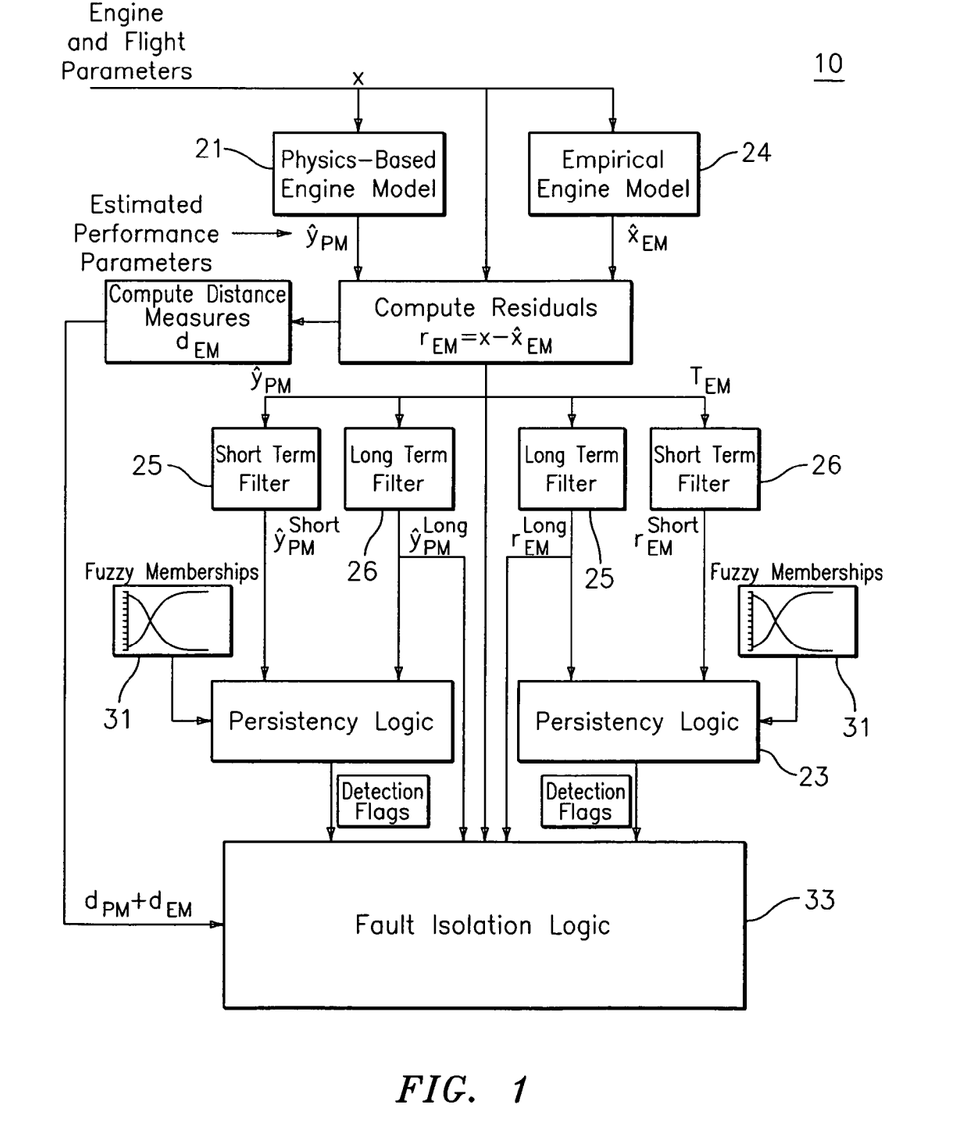
FIG. 1—A diagram of the system of the present invention.

The models, signal processing, persistency checks and isolation logic are illustrated with reference to FIG. 1 wherein there is shown one embodiment of a fault detection and isolation system 10 of the present invention.

The physics based engine model 21 can be, but is not limited to, a simple piecewise linear State Variable Model (SVM) or a variant thereof, a non-linear aero-thermodynamic model, or a hybrid model containing both a physics-based and empirical components. Whatever its nature, it shall accept a vector, (x), of m monitored engine and aircraft parameters as input and produce as output:

Expected (Physics Model) estimate vector for these parameters ($\hat{x}_{PM}$), e.g.

$$x = \begin{bmatrix} N_1 \\ N_2 \\ T_3 \\ \vdots \\ P_5 \end{bmatrix}, \hat{x}_{PM} = \begin{bmatrix} \hat{N}_1 \\ \hat{N}_2 \\ \hat{T}_3 \\ \vdots \\ \hat{P}_5 \end{bmatrix}$$

and,

Module Performance $\Delta$ estimates $\hat{y}_{PM}$, consisting of changes in component efficiencies ($\eta$) and Flow Parameters ($\Gamma$) for each major module, e.g.

$$\hat{y}_{PM} = \begin{bmatrix} \hat{y}_{PM}(1) \\ \hat{y}_{PM}(2) \\ \hat{y}_{PM}(3) \\ \vdots \\ \hat{y}_{PM}(n_{PM}) \end{bmatrix} = \begin{bmatrix} \Delta\eta_{FAN} \\ \Delta\Gamma_{FAN} \\ \Delta\eta_{HPC} \\ \vdots \\ \Delta\eta_{LPT} \end{bmatrix}$$

Methods for calculating these types of estimates are known in the art.

The empirical engine model 24 can be developed using a variety of known constructions such as linear or non-linear ARMA (Auto-Regressive Moving Average) models, an assortment of Artificial Neural Network (ANN) constructions (Multi-Layer Perceptron Networks, Radial Basis Function Networks, etc), standard statistical regression models and so forth. Whatever the form, the empirical model will accept a vector of monitored engine and aircraft parameters (x) as input and produce as output:

Expected (Empirical Model) estimate vector for these parameters ($\hat{x}_{EM}$)

Residual vector $r_{EM} = x - \hat{x}_{EM}$

Distance metric vector $d_{EM}$ that quantifies how closely each of the observed engine parameters match the model. Various metrics are possible, largely depending on the nature of the empirical model being used. One such possibility is $$d_{EM} = \|r\| = \sqrt{\sum_i r_i^2}.$$

The overall methodology of the present invention makes use of signal processing logic to test for parameter deviation persistency to detect and distinguish true deviations from parameter/system noise induced deviations. The intent of so doing is to detect true deviations and reduce false alarms for short term temporal deviations caused by measurement and process noise. The heart of the persistency logic 23 consists of tracking the output parameters and distance measures of both models by both long term filters 25 and short term filters 26. The filters 25, 26 may take a variety of forms, for example rolling averages, exponential averages, median filters, etc. Whatever the form, it is preferred that long and short term filters 25, 26 be of the same construction. That is to say, regardless of the manner in which the long and short term filters 25, 26 are implemented, each long term filter 25 and its corresponding short term filter 26 should be of the same form noted above. The time constants involved in the filter design become tuning elements to be determined through simulation studies and will in part depend on the sample rate of the input and output data as well as parameter noise levels.

The divergence between these two types of filters 25, 26 is used to detect the initial onset of a parameter trend as well as its degree of persistency. This is done on an individual parameter basis. Persistency logic 23 will be described that will recognize initial large deviations (between long and short term filtered parameters) followed by a subsequent convergence back to small deviations as the central indicator that a persistent trend shift had occurred. The quantification of large and small deviations can most easily be made through the use of fuzzy membership functions 31. Attendant logic can address the classification problem for detected trends.

Figure 2:
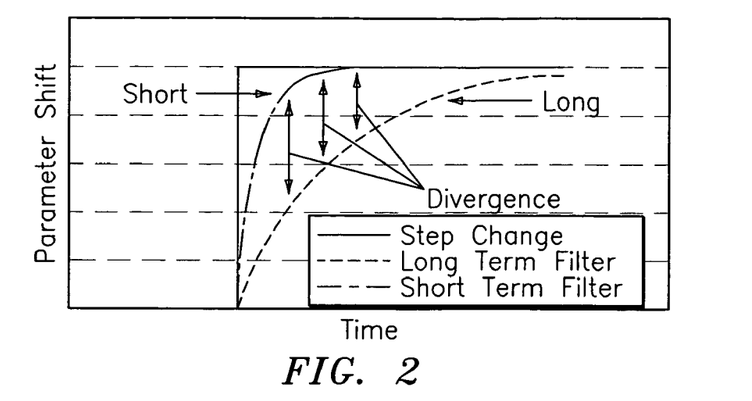
FIG. 2—An illustration of short and long term filter response to a step change.

The short and long-term filters 25, 26 may take many forms. The preferred feature for the filters is that they exhibit a measurable difference in response to a step change as illustrated in FIG. 2.

One method to achieve this is through the use of exponential average filters. These filters take the following form:

$$r_{EM}^{Short} = \alpha_{Short} r_{EM}^{Short} + (1 - \alpha_{Short}) r_{EM}$$

$$\hat{y}_{PM}^{Short} = \alpha_{Short} \hat{y}_{PM}^{Short} + (1 - \alpha_{Short}) \hat{y}_{PM}$$

and $$r_{EM}^{Long} = \alpha_{Long} r_{EM}^{Long} + (1 - \alpha_{Long}) r_{EM}$$

$$\hat{y}_{PM}^{Long} = \alpha_{Short} \hat{y}_{PM}^{Long} + (1 - \alpha_{Short}) \hat{y}_{PM}$$

where $\alpha_{Short} < \alpha_{Long}$

Median filters across long and short window buffers work equally as well.

The arithmetic difference (termed divergence) between these two filtered signals provide the requisite information for determining whether the monitored signal has sustained a persistent shift. This is applied on a parameter by parameter basis for each of the monitored engine parameter (residual) signals.

The persistency logic is applied to the differences between the short and long term filtered parameter vectors for both the Physics-based Model $\{\hat{y}_{PM}^{Short}, \hat{y}_{PM}^{Long}\}$ and the Empirical Model $\{r_{EM}^{Short}, r_{EM}^{Long}\}$. These differences define the divergence parameter vectors $div_{PM}$ and $div_{EM}$, where $$\text{div}_{PM}(i) = |\hat{y}_{PM}^{Short}(i) - \hat{y}_{PM}^{Long}(i)| \, i=1, 2, \ldots, n_{PM}$$

$$\text{div}_{EM}(j) = |r_{EM}^{Short}(j) - r_{EM}^{Long}(j)| \, j=1, 2, \ldots, m$$

Figure 3:
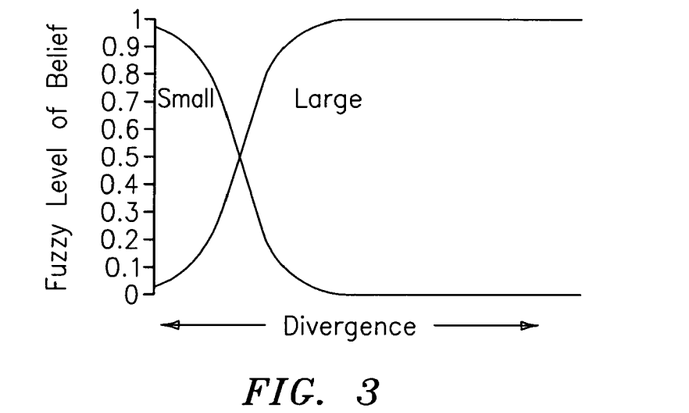
FIG. 3—An illustration of small and large fuzzy membership functions.

The divergence parameter vectors provide the information to assess whether a persistent shift has occurred. The process makes use of fuzzy membership functions 31 to assess whether or not the divergence is large or small. Although these membership functions can take many forms, the sigmoid functions depicted in FIG. 3 are illustrative of the concept.

To assist in the fault isolation associated with detected parameter shifts, a very long filter is maintained for each parameter to establish a Reference level from which the transgression was observed. By "very long" it is meant that the very long term filter operates upon a plurality of data inputs received over a period of time longer than that used in either the long or short term filters 25, 26. These are calculated in the same manner as the long filtered parameters with appropriate filter constants. For example, if exponential averages are being used, the Reference values are calculated as $$r_{EM}^{Reference} = \alpha_{Very\_Long} r_{EM}^{Reference} + (1 - \alpha_{Very\_Long}) r_{EM}$$

$$\hat{y}_{PM}^{Reference} = \alpha_{Very\_Long} \hat{y}_{PM}^{Reference} + (1 - \alpha_{Very\_Long}) \hat{y}_{PM}$$

where $\alpha_{Short} < \alpha_{Long} < \alpha_{Very\_Long}$

The persistence logic proceeds as follows (for each parameter under consideration):

1. Calculate divergence vectors (Eq.1)
2. Determine fuzzy Level of Belief (LOB) of being Small for each divergence element for both models.

$$\text{LOB}[\text{div}_{PM}(i) \text{ is Small}] = \text{LOB}_{PM}^{(Small)}(i), i=1, 2, \ldots, n_{PM}$$

$$\text{LOB}[\text{div}_{EM}(j) \text{ is Small}] = \text{LOB}_{EM}^{(Small)}(j), j=1, 2, \ldots, m$$

Note: LOB of being large is easily computed as $$\text{LOB}_{PM}^{(Large)}(i) = 1 - \text{LOB}_{PM}^{(Small)}(i), i=1, 2, \ldots, n_{PM}$$

$$\text{LOB}_{EM}^{(Large)}(j) = 1 - \text{LOB}_{EM}^{(Small)}(j), i=1, 2, \ldots, m$$

3. Determine if any LOB is above pre-defined threshold level of confidence for being Large, $\text{conf}^{(Large)}$, i.e.

$$\text{LOB}_{PM}^{(Large)}(i) > \text{conf}^{(Large)} \text{ or } \text{LOB}_{EM}^{(Large)}(j) > \text{conf}^{(Large)}$$

4. If a threshold level is exceeded for a given parameter then
   a. A trend detection flag ($TD_{PM}^{flag}(i)=1, TD_{EM}^{flag}(j)=1$) is set for that parameter and the flag is latched.
   b. The Reference value, $\hat{y}_{PM}^{Reference}$ for the parameter in question is used to calculate the parameter offset. For example, if the $i^{th}$ parameter from the Physical Model was flagged, we would calculate $$\Delta \hat{y}_{PM}(i) = \hat{y}_{PM}(i) - \hat{y}_{PM}^{Reference}(i) \quad (2a)$$

Likewise, for the $j^{th}$ parameter from the Empirical Model, we would calculate $$\Delta r_{EM}(j) = r_{EM}(j) - r_{EM}^{Reference}(j) \quad (2b)$$

These values can be utilized in the Fault Isolation and identification process using fault isolation logic 33. The signature formed by these $\Delta$ deviations can be compared to known fault signatures to identify the underlying fault.

Figure 4:
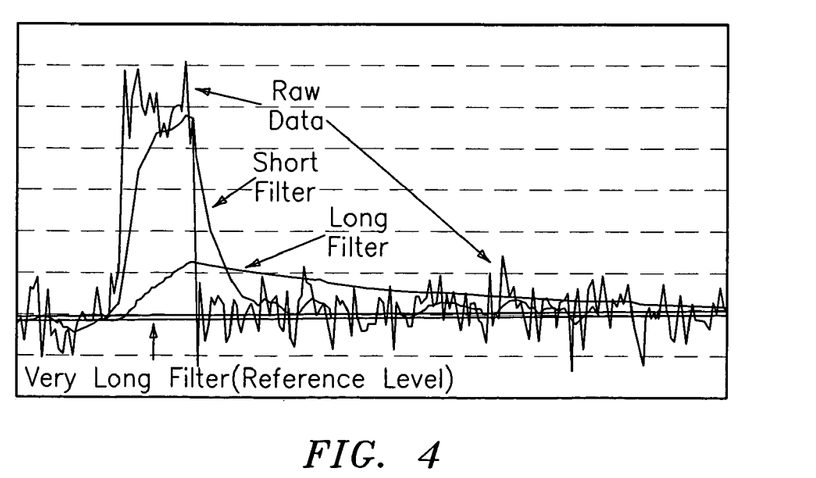
FIG. 4—An illustration of a non-persistent perturbation.
Figure 5:
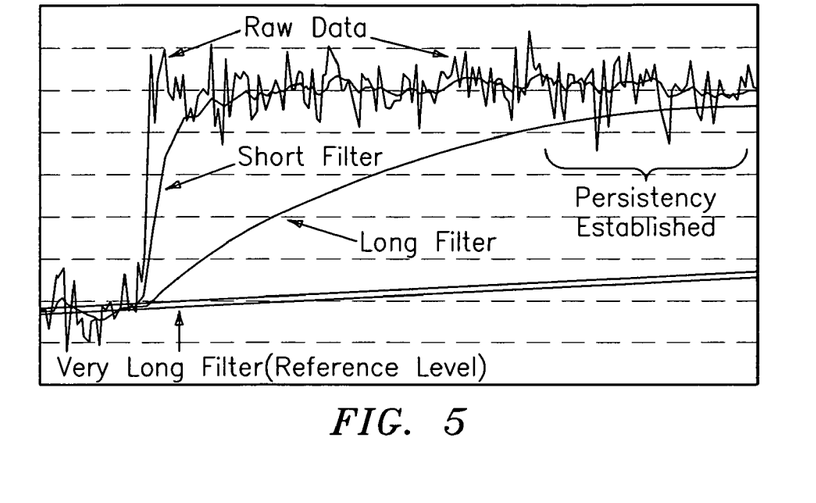
FIG. 5—An illustration of a persistent perturbation.

Referring to FIG. 2, in order to establish persistency for the observed deviation(s), one needs to observe that the divergence values will eventually become Small within a certain level of confidence. One needs, however, to safeguard against the situation where a Large divergence is observed, followed by a reversal within a short duration, i.e. the process must avoid flagging (as persistent) noise induced perturbations as depicted in FIG. 4 below as opposed to truly persistent shifts as depicted in FIG. 5.

Figure 6:
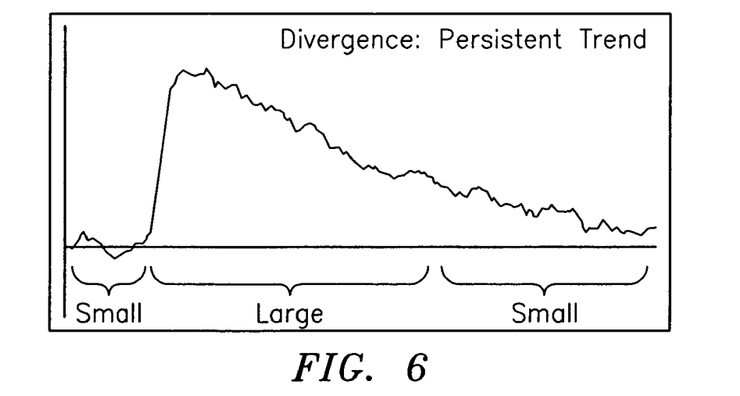
FIG. 6—An illustration of divergence in the case of a persistent perturbation.
Figure 7:
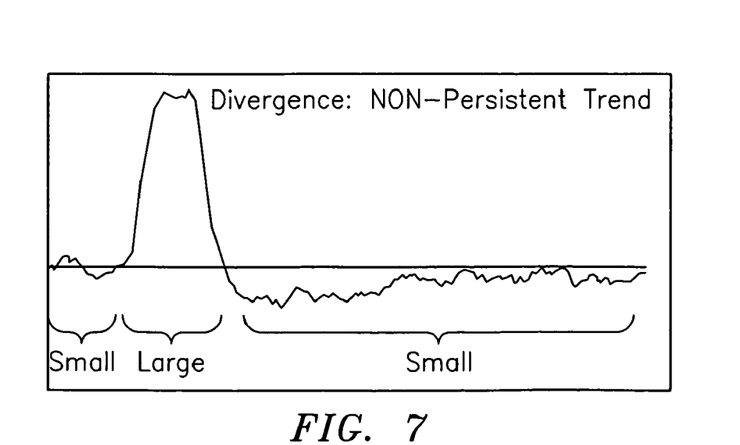
FIG. 7—An illustration of divergence in the case of a non-persistent perturbation.

In both instances (FIGS. 4 & 5), the divergence between the long and short filtered values sweep from Small to Large and back to Small (see FIGS. 6 & 7).

In order to differentiate between these two scenarios, a second set of long and short filters are introduced using the (already) short filtered values ($r_{EM}^{Short}(j)$ and $\hat{y}_{PM}^{Short}(i)$) of the parameters that have a detected shift as a starting baseline. If we refer to these variables as $r_{EM}^{Short2}(j)$, $\hat{y}_{PM}^{Short2}(i)$, and $r_{EM}^{Long2}(j)$, $\hat{y}_{PM}^{Long2}(i)$ respectively, they are calculated (in the case of exponential averages) as follows:

$$r_{EM}^{Short2}(j) = \begin{cases} r_{EM}^{Short}(j) & \text{if } TD_{EM}^{flag}(j) = 0 \\ \alpha_{Short2} r_{EM}^{Short2}(j) + (1 - \alpha_{Short2}) r_{EM}(j) & \text{if } TD_{EM}^{flag}(j) = 1 \end{cases}$$

$$r_{EM}^{Long2}(j) = \begin{cases} r_{EM}^{Short}(j) & \text{if } TD_{EM}^{flag}(j) = 0 \\ \alpha_{Long2} r_{EM}^{Long2}(j) + (1 - \alpha_{Long2}) r_{EM}(j) & \text{if } TD_{EM}^{flag}(j) = 1 \end{cases}$$

$$\hat{y}_{PM}^{Short2}(i) = \begin{cases} \hat{y}_{PM}^{Short}(i) & \text{if } TD_{PM}^{flag}(i) = 0 \\ \alpha_{Short2} \hat{y}_{PM}^{Short2}(i) + (1 - \alpha_{Short2}) \hat{y}_{PM}(i) & \text{if } TD_{PM}^{flag}(i) = 1 \end{cases}$$

$$\hat{y}_{PM}^{SLong2}(i) = \begin{cases} \hat{y}_{PM}^{Short}(i) & \text{if } TD_{PM}^{flag}(i) = 0 \\ \alpha_{Long2} \hat{y}_{PM}^{Long2}(i) + (1 - \alpha_{Long2}) \hat{y}_{PM}(i) & \text{if } TD_{PM}^{flag}(i) = 1 \end{cases}$$

where $\alpha_{Short2} < \alpha_{Long2}$

One capitalizes on this information by computing a second divergence term for these secondary Short and Long Filter parameters, i.e.

$$\text{div}_{PM}^2(i) = |\hat{y}_{PM}^{Short2}(i) - \hat{y}_{PM}^{Long2}(i)| \, i=1, 2, \ldots, n_{PM}$$

$$\text{div}_{EM}^2(j) = |r_{EM}^{Short2}(j) - r_{EM}^{Long2}(j)| \, j=1, 2, \ldots, m$$

These values establish a means to track the (new) shifted level. If a divergence between these filtered parameters occurs, then it would indicate that the shift was temporary. If, however, the divergence remains small, then persistence is established. In mathematical terms we perform the following:

i. Determine the Level Of Belief that the secondary divergence ($\text{div}_{PM}^{(2)}(i)$ or $\text{div}_{EM}^{(2)}(j)$) is Small to a prescribed confidence level, i.e.

$$\text{LOB}[\text{div}_{PM}^{(2)}(i) \text{ is Small}] = \text{LOB}^{PM(Small2)}(i) > \text{conf}^{(Small2)}$$

$$\text{LOB}[\text{div}_{EM}^{(2)}(j) \text{ is Small}] = \text{LOB}^{EM(Small2)}(j) > \text{conf}^{(Small2)}$$

ii. IF $TD_{PM}^{flag}(i) = 1$ And $$\text{LOB}_{PM}^{(Small2)}(i) > \text{conf}^{(Small2)}$$

And

LOB[|div$_{PM}^{(2)}$(i)−div$_{PM}$(i)| is Small]>conf$^{Small3}$

THEN

Persistence is established.

Similar analysis is performed for the EM parameters.

Figure 8:
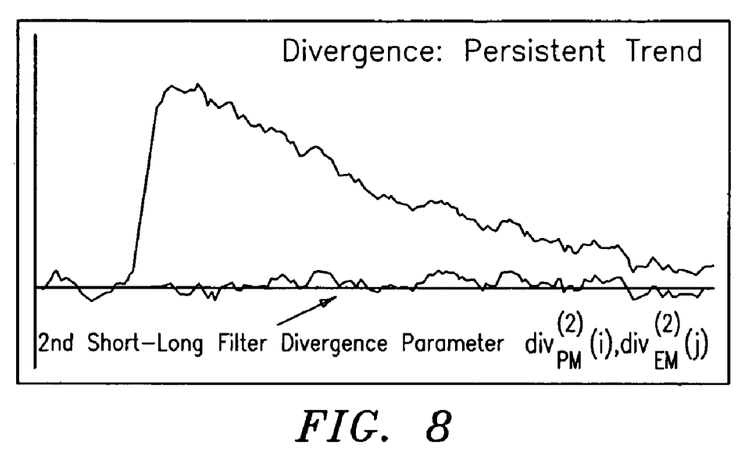
FIG. 8—An illustration of the $2^{nd}$ short term filter parameter of a persistent perturbation.
Figure 9:
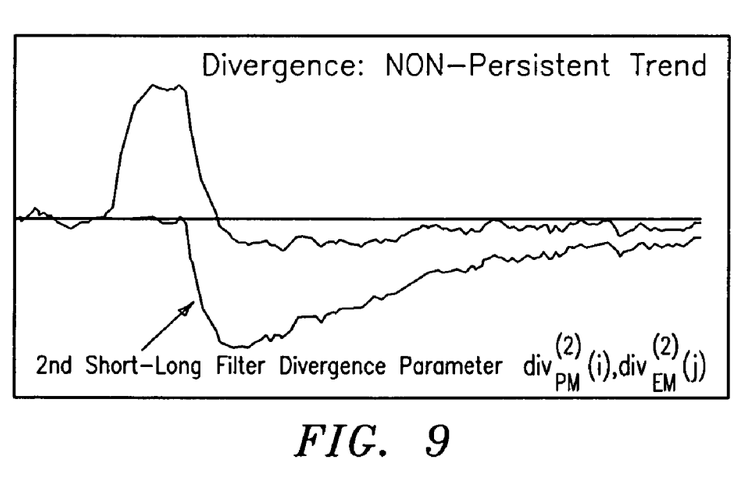
FIG. 9—An illustration of the $2^{nd}$ short term filter parameter of a non-persistent perturbation.

The effect of a Persistent and Non-Persistent trend shift on the primary and secondary divergence parameters is illustrated with reference to FIGS. 8 and 9.

Once the persistence of a shift in a parameter (or a set of parameters) is established, calculated delta shifts from the reference level (equations 2a and 2b) are used in the Fault Isolation process to determine the cause of the shift(s). Methods for accomplishing this are known in the art and vary from model-based methods using Kalman filters to empirical methods using Neural Networks and Fuzzy Logic, (to name a few). The process of Fault Isolation can be enhanced by taking advantage of the fact that we have available both Physics-Based Model (PM) performance parameters as well as Empirical Model (EM) residual information. For example, if one or more performance fault (PM) demonstrates a persistent shift and only one (EM) residual has a persistent shift we could conclude that the cause is probably due to a measurement (bias) error (the measurement associated with the shifted the residual) and that the performance shifts are a miss-assessment consequence. Likewise, a persistent performance fault shift (PM) accompanied by more than one (EM) residual shift would more probably be indicative of a true performance problem and not a collection of individual measurement (bias) errors. Logic along these lines can be developed and coupled with known methods of fault isolation to further enhance the process.

Figure 10:
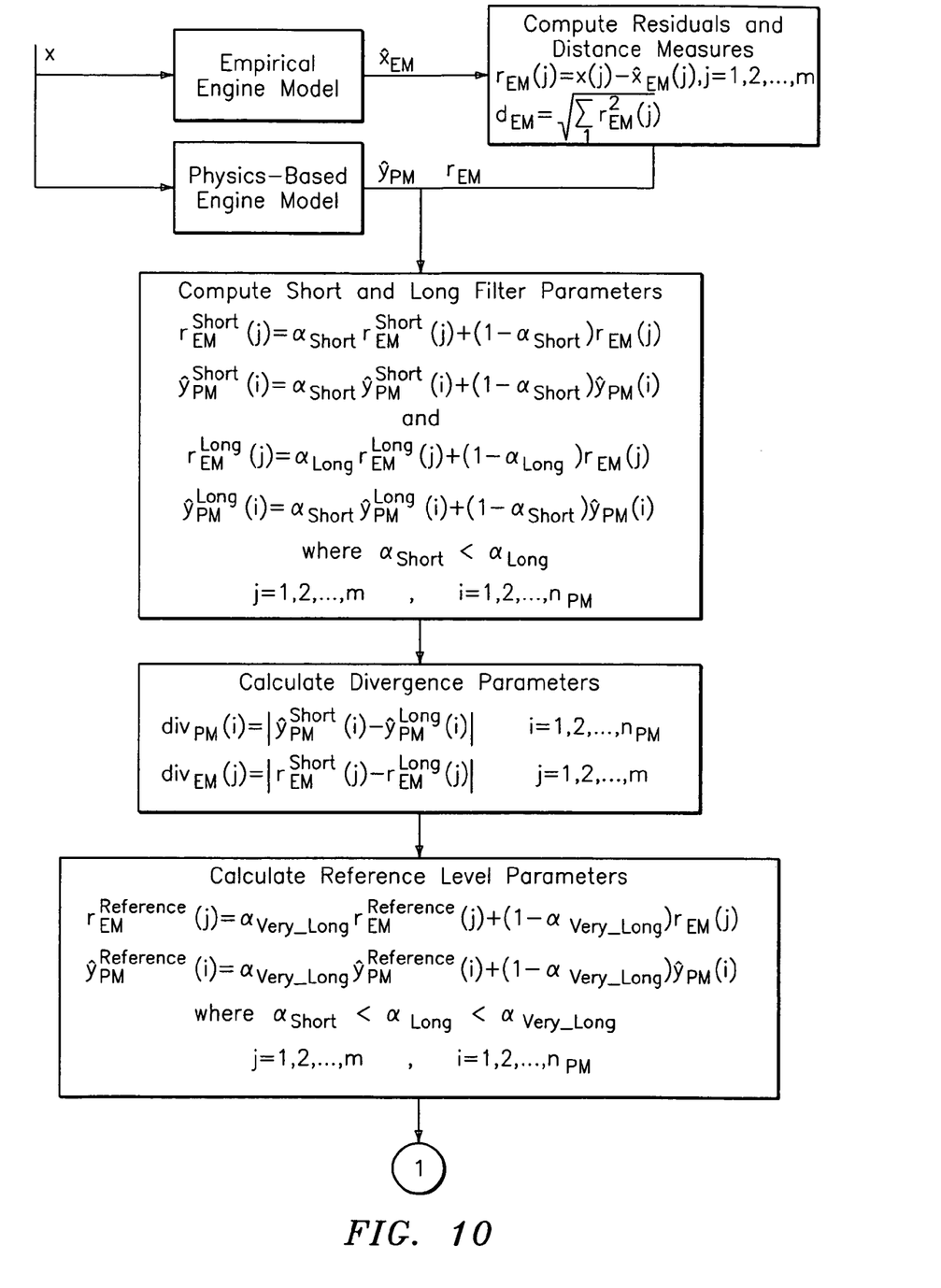
FIG. 10—A flow chart of the logic of the method of the present invention.
Figure 11:
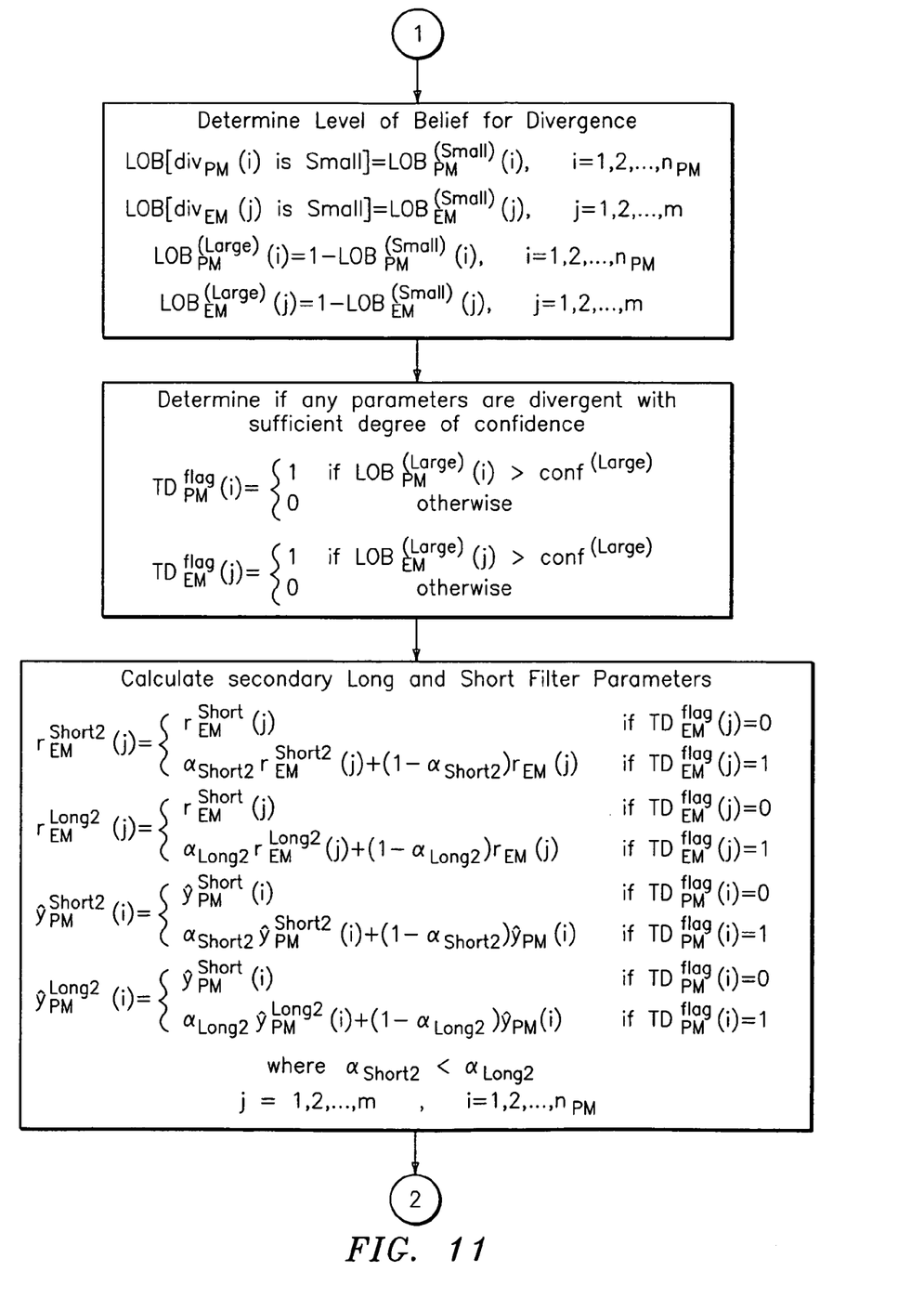
FIG. 11 A second part of the flow chart of FIG. 10 is shown.
Figure 12:
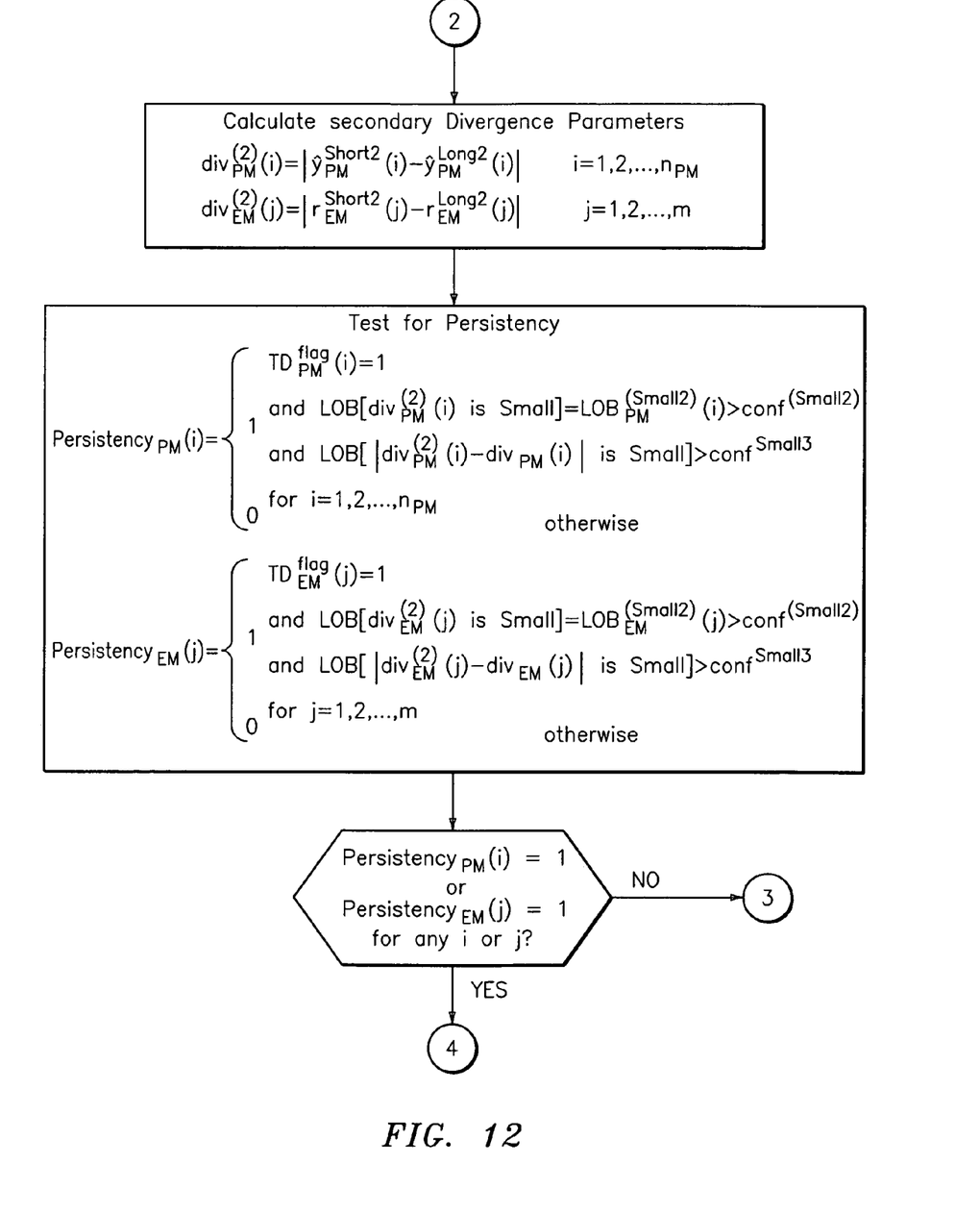
FIG. 12 The third part of the flow chart of FIG. 10 is shown.

An overview of one embodiment of the hybrid model based detection and isolation system is presented in the logic flow diagram depicted in FIG. 10. The models, signal processing, and persistency checks and isolation logic of the fault detection and isolation system 10 may be, but need not be, implemented on a general purpose electronic computing device. As a result, fault detection and isolation system 10 can be implemented on any device capable of receiving digital electronic input and performing arithmetic and other digital signal processing logic upon such input so as to isolate the occurrence of engine faults in accordance with the above description. The logic performed by all modules of fault detection and isolation system 10, including, but not limited to, physics-based engine model 21. Empirical engine model 24, short term filters 25, long term filters 26, persistency logic 23, and fault isolation logic 33, may be implemented in a general purpose electronic computing device as software or may be implemented in hardware.

It is apparent that there has been provided in accordance with the present invention a system, and method for utilizing such a system, for detecting and isolating faults in the operation of an engine. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. Method for detecting faults in a device comprising the steps of:
    receiving a plurality of performance parameters;
    applying said plurality of performance parameters to a first model to produce a plurality of estimated performance parameters;
    applying said plurality of performance parameters to a second model to produce a plurality of estimated device parameters;
    computing a plurality of residuals from said plurality of estimated device parameters;
    computing a plurality of distance measuring from said plurality of residuals;
    detecting at least one parameter deviation using said plurality of residuals and said plurality of estimated performance parameters; and
    setting at least one detection flag if said detected at least one parameter deviation is persistent.

2. The method of claim 1 wherein said device is an engine.

3. The method of claim 1 comprising the additional step of performing fault isolation using said plurality of distance measures and said at least one detection flag.

4. The method of claim 1 wherein receiving said plurality of performance parameters comprises receiving a plurality of engine parameters.

5. The method of claim 1 wherein receiving said plurality of performance parameters comprises receiving a plurality of flight parameters.

6. The method of claim 1 wherein receiving said plurality of performance parameters comprises receiving said plurality of performance parameters selected from the group consisting of spool speeds, fuel flow, inter-stage temperatures, inter-stage pressures, bleed commands, variable geometry commands, ambient indicators, and aircraft flight condition indicators.

7. The method of claim 1 wherein said applying said plurality of performance parameters to said first model comprises applying said plurality of performance parameters to a physics based engine model.

8. The method of claim 7 wherein said applying said plurality of performance parameters to a physics based engine model comprises applying said plurality of performance parameters to a physics based engine model selected from the group consisting of a state variable model (SVM), a non-linear aero-thermodynamic model, and a hybrid model.

9. The method of claim 1 wherein said applying said plurality of performance parameters to said second model comprises applying said plurality of performance parameters to an empirical engine model.

10. The method of claim 9 wherein said applying said plurality of performance parameters to an empirical engine model comprises applying said plurality of performance parameters to an empirical engine model selected from the group consisting of a linear Auto-Regressive Moving Average model, artificial neural network, multi-layer perception networks, radial basis function networks, and statistical regression models.

11. The method of claim 1 wherein said detecting step comprises the additional steps of:
    applying a long term filter and a short term filter to each of said plurality of residuals; and
    applying a long term filter and a short term filter to each of said plurality of estimated performance parameters.

12. The method of claim 11 comprising the additional step of performing persistency logic on an output of said long term filter applied to each of said plurality of residuals, an output of said short term filter applied to each of said plurality of residuals, and a fuzzy membership to detect said at least one parameter deviation.

13. The method of claim 11 comprising the additional step of performing persistency logic on an output of said long term filter applied to a plurality of estimated performance parameters, an output of said short term filter applied to a plurality of estimated performance parameters, and a fuzzy membership to detect said at least one parameter deviation.

14. Apparatus for isolating and detecting faults in a device comprising:
- means for receiving a plurality of performance parameters;
- means for applying said plurality of performance parameters to a first model to produce a plurality of estimated performance parameters;
- means for applying said plurality of performance parameters to a second model to produce a plurality of estimated device parameters;
- means for computing a plurality of residuals from said plurality of estimated device parameters;
- means for computing a plurality of distance measuring from said plurality of residuals;
- means for detecting at least one parameter deviation using said plurality of residuals and said plurality of estimated performance parameters; and
- means for setting at least one detection flag if said detected at least one parameter deviation is persistent.

15. The apparatus of claim 14 wherein the device is an engine.

16. The apparatus of claim 14 additionally comprising a means for performing fault isolation using said plurality of distance measures and said at least one detection flag.

17. The apparatus of claim 14 wherein said plurality of performance parameters comprises a plurality of engine parameters.

18. The apparatus of claim 14 wherein said plurality of performance parameters comprises receiving a plurality of flight parameters.

19. The apparatus of claim 14 wherein said plurality of performance parameters is selected from the group consisting of spool speeds, fuel flow, inter-stage temperatures, inter-stage pressures, bleed commands, variable geometry commands, ambient indicators, and aircraft flight condition indicators.

20. The apparatus of claim 14 wherein said first model comprises a physics based engine model.

21. The apparatus of claim 20 wherein said physics based engine model is selected from the group consisting of a state variable model (SVM), a non-linear aero-thermodynamic model, and a hybrid model.

22. The apparatus of claim 14 wherein said second model comprises an empirical engine model.

23. The apparatus of claim 22 wherein said empirical engine model is selected from the group consisting of a linear Auto-Regressive Moving Average model, artificial neural network, multi-layer perception networks, radial basis function networks, and statistical regression models.

24. A method for detecting faults in a device, comprising the steps of:
- receiving a plurality of performance parameters;
- detecting a deviation of at least one of said parameters;
- determining a persistency of said deviation; and
- setting at least one detection flag if said deviation is persistent;
- wherein said determining step uses a short term filter and a long term filter.

25. The method of claim 24, wherein said short term and long term filters are of the same construction.

* * * * *